United States Patent Office 3,360,995
Patented Jan. 2, 1968

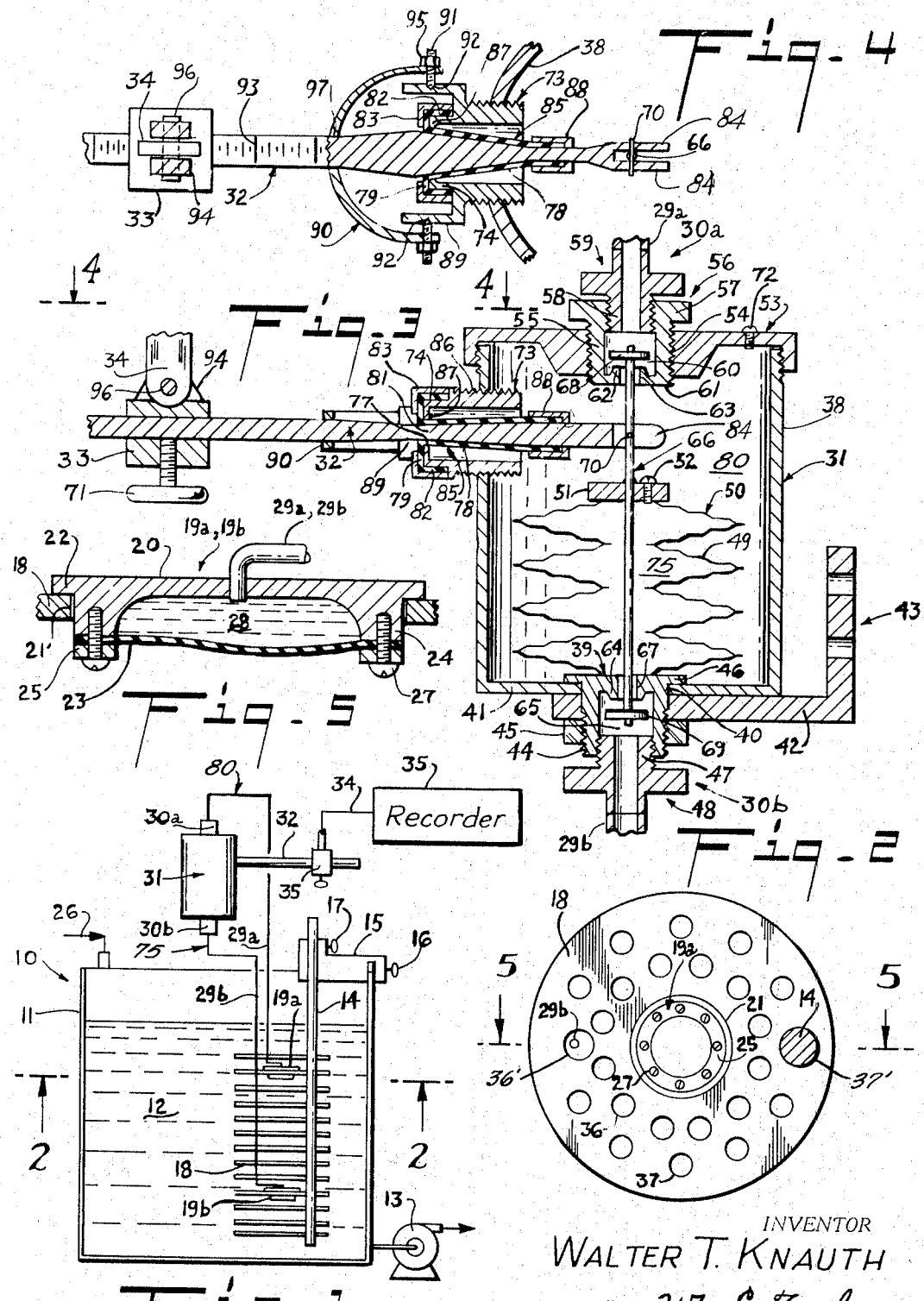

3,360,995
APPARATUS FOR CONSTANTLY INDICATING SPECIFIC GRAVITY OF MATERIAL LADEN LIQUID
Walter T. Knauth, 1334 W. Gray, Houston, Tex. 77019
Filed Apr. 28, 1965, Ser. No. 451,502
2 Claims. (Cl. 73—438)

ABSTRACT OF THE DISCLOSURE

The apparatus continuously measures specific gravity in a material laden liquid passed through a container as reflected in pressure differential changes between two vertically spaced apart, downwardly facing, closed fluid system diaphragms disposed in the laden liquid. The fluid systems are counterpoised across a resilient means in a compartment, with its movement responsive to pressure differential changes being sealably, pivotally translated through the compartment wall to a recorder. Vertically aligned, horizontally disposed plates between and below diaphragms channelize any laden fluid vertical motion components to substantially horizontal movement between plates and thus not upwardly against diaphragms to affect recording.

---

This invention relates to apparatus for constantly indicating specific gravity or density of material laden liquid which changes in specific gravity as in the course of passing continuously through a container, pit or conduit, as for instance, oil well drilling "mud" or circulating fluid.

The invention in particular has as a primary object the provision of apparatus for constantly indicating the specific gravity or density of such a material laden liquid by apparatus which translates the hydraulic head between two predetermined levels of such liquid at any instant, into pressure differential indications, whereby the indications are readable directly in terms of the specific gravity or density of the material laden liquid.

The invention also has an object the provision of apparatus of this class which requires a minimum of parts put together to achieve the greatest positive action, and to provide the greatest ease in adjustment.

It is also a further object of the invention to provide apparatus of this class which baffles the liquid passage through the container in manner to neutralize or standardize the action of any horizontal components of liquid movement through the container.

It is yet another object of the invention to provide apparatus of this class in which the pressure differential indicated in terms of specific gravity or density indications comprises the difference in the pressure of the liquid acting within a belliphragm and the pressure of the liquid acting on the exterior of the belliphragm.

Other and further objects will be apparent when the specification herein is considered in connection with the drawings, in which:

FIG. 1 is a transverse elevational view through a container, partially diagrammatic, showing the apparatus in the container, the view also showing diagrammatically the pertinent apparatus exteriorally of the container;

FIG. 2 is a bottom view of a baffle and affixed apparatus, taken along line 2—2 of FIG. 1;

FIG. 3 is an enlarged sectional elevational view of the belliphragm compartment and pressure differential transmitting leverage shown diagrammatically in FIG. 1;

FIG. 4 is a plan view, part in section, taken along line 4—4 of FIG. 3; and

FIG. 5 is an enlarged sectional elevational view of a diaphragm closed chamber, as shown in FIG. 1.

Referring in detail to the drawings in which like reference numerals are applied to like elements in the various views, the apparatus 10 includes a container 11, as a tank, into which fluid 12, as for instance a liquid carrying clay and other drilling mud additives, is entered through an inlet 26, a pump 13 being shown taking suction from near the bottom of the tank to discharge the material laden liquid onwardly, as down a well bore. A support rod 14 is connected near its top to an adapter bracket 15, an adjustment nut 16 affixing the bracket 15 to a side of the tank and an adjustment nut 17 affixing the support rod 14 to the bracket 15.

Baffle plates 18, shown round in FIG. 2, are each provided with a bore 37' therethrough, and through which the rod 14 is passed in assembly, and these plates 18 are equally, vertically spaced upon the vertical support rod 14, as by spot welding, or by set screws, not shown, upper and lower hydrostatic fluid chambers 19a, 19b being respectively mounted on an upper and a lower baffle plate 18 spaced apart at a predetermined distance. Each chamber 19a, 19b, comprises a correspondingly constructed housing or inverted plate 20, to fit in a bore 21 through the respective baffle plate 18 on which it is mounted, a flange 22 being provided on the housing 20 to provide a rim to rest on the top surface of the baffle plate.

A flexible diaphragm 23, of rubber, neoprene, leather, or similar material, is fitted to the under surface or rim 24 of the housing 20 by means of a hold-on ring 25 affixed to the rim 24 by means of machine screws 27, the machine screws passing through the ring 25, the outer portion of the diaphragm 23, and threadably into the plate rim 24, to affix the ring 25 and diaphragm 23 to the plate at equally, angularly spaced distances apart.

Hydrostatic fluid 28 fills the diaphragm enclosed space of each chamber 19a, 19b, and conduits 29a, 29b lead respectively therefrom to the upper and lower inlets 30a, 30b into a hydrostatic fluid balancing compartment 31 which may be mounted exteriorally of the tank or container 11. A lever 32, to be herein below described in detail, moves responsive to changes in pressure differential between the hydrostatic fluid pressures acting in the respective conduits 29a, 29b and an adjustment block 33 connects the lever 32 to a lever or linkage 34 which transmits movement of lever 32 to a recorder 35.

Each baffle plate 18 is similarly constructed and provides an aforesaid central bore 21 therethrough, and concentric with the bore 21 an inner ring of baffle bores 36 and an outer ring of baffle bores 37. A bore 36' is also provided in each plate 18, and these bores 36' are vertically aligned as the plates 18 are preferably assembled in vertical alignment, so that the conduit 29a from the lower diaphragm 19b may best be passed upwardly.

As shown in FIGS. 3 and 4, the compartment 31 comprises a tubular body 38 with closed lower end, an adapter plug 39 passing through a central bore 40 through the body closure 41, and through the outstanding leg 42 of a bracket 43, with the externally threaded lower end 44 of the plug 39 having a washer 45 threaded thereon to bear upon the under surface of the bracket leg 42 as a flange 46 on the upper end of the plug 39 bears upon the upper face of the closure 41, whereby the plug 39 firmly connects the compartment 31 and bracket 43.

Also, the plug 39 is internally threaded within its lower end 44 to receive the externally threaded upper end 47 of an adapter fitting 48 comprising the upper end of the conduit 29b.

A conventional belliphragm 50 is connected to the top of the plug 39, as by brazing or welding, the belliphragm 50 being crimped, thin wall metal sections 49 corresponding with bellows sections. A top disc 51 is mounted on top of the upper belliphragm section, also as by brazing or welding, and a machine screw 52 is shown threadable through the top disc 51 to be removed to permit the escape of air which may accumulate in the belliphragm when it is filled with hydraulic fluid.

A top lid or closure cap 53 is threadable upon the upper end of the compartment cylinder 31. Such closure cap 53 has a central threaded bore 54 therethrough to receive the externally threaded compartment shank 55 of an upper adapter plug 56, which has as its upper element a flange 57, the flange 57 being internally threaded centrally thereof to receive the externally threaded lower end 58 of an upper adapter 59 threadably thereinto. Such upper adapter 59 comprises the lower element of the upper conduit 29a. The shank 55 of the upper adapter plug 56 has a hollow space 60 provided therein and an enclosing partition 61 across the bottom thereof defines the lower extent of such hollow space. The partition 61 has an upwardly extending boss 62 therein, and a bore 63 is provided centrally through the partition, for a purpose to be hereinbelow described.

Also, the lower adapter plug 39 has a flange or head 46 which seats within the compartment 31, and on the bottom thereof, while a downwardly extending boss 64 extends below the flange 46 to determine the upper limits of a hollow space 65 provided centrally within the plug 39. The lower limits of the space 65 are defined, correspondingly as in the case of the upper adapter plug 56, by the upper face of a lower adapter 48 which comprises the lowermost element of the lower conduit 29b.

A valve stem or rod 66 passes through the bore 63 of the upper adapter plug partition 61 and through a central bore through the disc 51 to which the rod 66 is rigidly connected as by welding or brazing. Below the disc 51 the rod 66 passes through the belliphragm 51 and through a bore 67 through the lower adapter plug head 46 and its downwardly extending boss 64. The upper and lower ends of the valve stem 66 are of reduced diameter and at its upper end the valve rod or stem 66 has a valve element 68 press-fitted or threaded thereon to seat downwardly on the upper face of the boss 62 to close the upper boss bore 63; also, the rod 66 has a lower valve element 69 preferably initially press-fitted thereon to seat upwardly on the lower face of the boss 64 to close the bore 67 therethrough. As indicated by the heavy black lines on the contacting faces of the respective upper and lower valve elements and bosses, these faces may be coated with a material, as rubber, to provide smoother seating surfaces.

The inner end of the lever 32 is pronged or bifurcated, with the prongs 84 bored to receive the ends of a pin 70 which passes with slight clearance through a bore through the valve stem 66. The lever 32 passes sealably, pivotally outwardly through a hollow nut 73, as will be hereinbelow described, the shank 86 of the nut being threadably connected through the wall of the tubular body 28 providing the compartment 31. The outer part or head 74 of the nut is of reduced diameter and has a closure wall 87 across the outer end thereof, the wall 87 having a rectangular slot 77 provided centrally therein. A seal member 85, as of rubber, includes centrally a resilient sheath which is slid over the lever 32 to fit snugly thereabout, including the part of the lever 81 which is of minimum depth or thickness, as shown in FIG. 3. A hold-down cup or sleeve 88 is slidable on the lever 32 to be slipped over the inner end of the sheath 78, thereby to anchor the sheath firmly on the lever 32.

The lever 32 has the plan contour shown in FIG. 4 and the elevation contour shown in FIG. 3, and thereby provides an area 81 of minimum depth or thickness at a lever fulcrum point to be hereinbelow described. The seal sheath 78 merges outwardly into a cap 79 which is turned back inwardly to provide a cylinder or flange 82 to fit snugly about the nut head 74. Outermost, a metallic cap 83, which is slotted centrally, is slid upon the lever 32 to fit tightly over the resilient sheath cap 79 and flange 82 to firmly assemble the nut 73, seal 85 and cap 83 together.

A half-ring bracket 90, slotted centrally at 97, is forced upon the lever 32 to a predetermined position where the end portions thereof overextend ears 89 which are provided on the nut head 74, as shown in FIG. 4. The ends of the bracket 90 are drilled and tapped on an axis passing through the nut closure wall 87 and receive threaded pivot pins 91 therethrough having tapered points at their inner ends to fit into countersunk pivot recesses 92 in the ears 89, whereby the lever 32 is mounted to move pivotally up and down responsive to movement of the valve stem 66 connected to the lever inner end prongs 84 within the compartment 31. Locknuts 95 are threaded on the outer ends of the pivot pins 91 to lock them to the bracket 90.

The lever 32 has scale graduations 93 engaged thereon whereby the distance of the axis of the connection block set screw 71 from the pivot axis 92, 92 may be measured. Also, the connection block 33 has two spaced apart lugs or bifurcations 94 on its upper side which are bored to receive the opposite ends of a pivot pin 96 passing through a journal bore in the lower end of the rod 34, whereby the rod 34 is pivotally connected to the connection block 33, as aforesaid.

The recorder 35 is any conventional type of mechanical device which may indicate and/or record continuously the specific gravity or density from instant to instant of liquid in and/or passing through the container 11. In practice the linkage or lever arm 34, which moves responsive to the aforesaid occurring changes in the specific gravity or density of the liquid, is pivotally connected to conventional linkage means, not shown, and contained by the recorder, which translates vertical movement of the arm 34 into angular movement, which moves and records in linear proportion to the movement of the arm 34. Such linkage means, not shown, carries adjustment means for adjusting its aforesaid proportional movement, as with relation to a dial or disc scale on which a needle or moving indicia may respectively record or indicate.

In practice, a liquid system 75, which may be termed the inner system comprised of the chamber 19b, conduit 29b, lower inlet 30b, and interior of belliphragm 50, and a liquid system 80, which may be termed the outer system comprised of the chamber 19a, a conduit 29a, upper inlet 30a, and interior of the compartment 31 externally of the belliphragm 50, may be filled and calibrated.

Initially with the chambers 19a and 19b spaced a predetermined vertical distance apart, as, for example, twelve inches apart, the lever 34 is positioned on the lever 32, by means of the setscrew 71, at a distance from the pin 70, that will produce movement of the recorder leverage needle over the range of the recorder dial or disk, corresponding with a change of container fluid density or specific gravity ranging from minimum to maximum, as from 1 to 2.5 in a case where oil well drilling mud is to be handled.

As a step prior to filling, rigid plates are placed across the lower parts of the inverted concave plates 20 of the chambers 19a, 19b to prevent any expansion of the diaphragms 28 by the filling hydraulic fluid.

The inner system 75 is first filled, prior to the installation of the cap 53 on the compartment 31, and before the screw 52 is installed in the top disc 51 to close the belliphragm 50.

As a first step the belliphragm 50 is evacuated of air and filled with a hydraulic fluid of specific gravity of, for example, unity or one, as for water. After which additional hydraulic fluid, or water, is added to pressurize the belliphragm 50 until it upstands to carry the valve stem 66 to position the lever 32 substantially horizontally, as shown in FIG. 3, while on the recorder 35, shown in FIG. 1, the conventional needle lever or indicator rests at substantially center of scale or dial. At this point the machine screw 52 is installed in the disc 51 to close the belliphragm 50.

The cap 53 is then replaced, the upper valve element 68 installed on the top of the valve stem 66, and the upper inlet 30a connected into the cap 53 to connect the conduit 29a and chamber 19a to complete the outer system 80. With the cap screw 72 removed from the cap 53, the outer system is then evacuated of air and filled with the same hydraulic fluid, of the same specific gravity or density, as used in filling the inner system 75.

The rigid plates across the diaphragms 23 of the concave plates 20 of the chambers 19a, 19b are then removed, and the chambers are emerged, spaced apart as shown, into the container 11 as it contains a liquid composed of a specific gravity or density of one. When this occurs the belliphragm 50 tends to collapse due to its internal or built-in spring tension and a small amount of fluid is pushed out therefrom to cause the diaphragm 20 of the chamber 19b to bellow out slightly with the consequence that the diaphragm 23 of the chamber 19a will bellow in following the movement of outer system fluid after the contracting of the belliphragm 50. Since the inner system 75 and outer system 80 have been filled with a hydraulic fluid of unit density, and has been immersed in a liquid of unity density, th elever needle, not shown, of the recorder moves to initial minimum reading, as of unit specific gravity or density.

Now, if the liquid in the container 11 is changed to a density or specific gravity at the maximum range figure of 2.5, then, with the chambers 19a, 19b spaced vertically apart as aforesaid, the pressure against the hydraulic fluid in the chamber 19b is greater than that against the hydraulic fluid 28 in the chamber 19a, so that the lower chamber diaphragm will bellow in and the upper chamber diaphragm will bellow out, in accordance with the pressure differential over the predetermined head, which is directly proportional to the density change between 1 and 2.5. In this case the displacement of fluid into the belliphragm causes movement via stem 66 and levers 32, 34 to move the recorder needle, not shown, to maximum reading, to indicate a specific gravity or density of 2.5.

With the two hydraulic fluid systems 75 and 80 thus filled, and with their sensing chambers 19a and 19b spaced a predetermined distance apart in the container 11 through which a liquid of changing density or specific gravity is to pass, it is then only necessary to calibrate, as aforesaid, against the readings and/or indications of a recorder 35, so that this instrument will give readings within a predetermined range, in terms of specific gravity or density of the liquid passing through the container at any point in time.

In case the density or specific gravity of a liquid being measured tends to fall below or rise above the respective lower and upper limits for which the recorder has been calibrated, safeguards are provided, respectively, to protect the belliphragm against excessive contraction or overexpansion. Such safeguards have been hereinabove identified, and the protection offered thereby resides in the fact that, if the density or specific gravity of the liquid being measured drops below unity, for example, the upper valve element 68 will seat on the upper boss 62 and close off the further movement of hydraulic fluid into the chamber 31, thereby stopping any further contraction of the belliphragm 49.

On the other hand, if the density or specific gravity of the liquid being measured rises above the maximum figure for which the recorder has been calibrated, or 2.5, for example, the lower valve element 69 will seat on the lower boss 64 and close off the further movement of hydraulic fluid into the interior of the belliphragm 49. In this manner excessive expansion of the belliphragm is obviated.

The invention is not limited to the structures disclosed, or to the particular method of employing sensing diaphragms in hydraulic fluid systems on opposite sides of resilient means to react to specific gravity differential changes in a liquid being measured, but rather the invention includes other methods as well by which specific gravity changes may be constantly effected on a graduated dial.

Also, the invention is not limited to the specific structures and methods of instrument construction and calibration hereinabove set forth, but as well includes other structures and calibration methods, which will obtain continuous movement of an indicia proportionate to continuous change of specific gravity or density of a liquid flowing through a container, as long as such structures and calibration methods fall within the broad spirit of this invention, and within the broad scope of interpretation called for and merited by the appended claims.

What is claimed is:

1. Specific gravity indicating apparatus for continuously indicating the specific gravity of a circulating material laden liquid and comprising a container through whch said laden liquid is passed, a first and second fluid system, each including a reservoir having a flexible diaphragm closure, said reservoirs being suspended within the liquid in said container to be measured at a predetermined fixed vertical distance apart, a resilient means expansible and contractible responsive to fluid actuation, a compartment surrounding said resilient means therewithin, a first and second conduit, respectively, from said first and second fluid reservoirs to said resilient means and into said compartment, fluid filling said systems including said conduits and said compartment and to urge said resilient means, leverage means with inner end pivotally connected to said resilient means and extending pivotally, sealably through said compartment and continuously movable proportional to resilient means movement responsive to change in pressure differential between the fluid in said systems as changed by change of specific gravity of the circulating material laden liquid, and leverage movement transmitting means pivotally connected to said leverage means exteriorally of said compartment to move an indicia directly responsive to leverage means movement, respective baffle plates being provided to support said sensing diaphragms in said laden liquid with respective diaphragm elements thereof disposed to face downwardly, and vertically spaced apart baffle plates also being provided for disposition between said respective sensing diaphragm supporting baffle plates and also below the respective lower sensing diaphragm supporting baffle plate, said baffle plates to present for adjacent baffles horizontally parallel, respectively overextending and underextending surface areas extending inwardly from the baffle peripheries thus to channelize any laden liquid movement between adjacent baffles in substantially horizontal direction, whereby said diaphragm elements respond substantially exclusively to change in the specific gravity of the liquid unaffected by laden liquid impact.

2. Specific gravity indicating apparatus for continuously indicating the specific gravity of a circulating material laden liquid as passed through a container, said apparatus comprising a first and second fluid system, each including a sensing diaphragm, said diaphragms being suspended within the liquid to be measured at a fixed vertical distance apart, a compartment spaced from said diaphragm, a resilient means expansible and contractible responsive to fluid actuation, and having one end anchored within said compartment and with the other end free therein, a first and second conduit, respectively, connecting the interior of said diaphragms to said resilient means and into said compartment, fluid filling said systems including said conduits and said compartment and to urge said resilient means, leverage means with inner end pivotally connected to said resilient means and extending pivotally, sealably through said compartment and continuously movable proportionate to resilient means movement responsive to change in pressure differential between the fluid in said systems as changed by change of specific gravity of the circulating material laden liquid, and leverage movement transmitting means pivotally connected to said leverage means exteriorally of said compartment to move an indicia directly responsive to leverage means movement, respective baffle plates being provided to support said reservoirs in said laden liquid with respective diaphragm closures downwardly, vertically spaced apart baffle plates also being provided for disposition between said respective reservoir supporting baffle plates and also below the lower reservoir to present for adjacent baffles horizontally parallel, respectively overextending and underextending surface areas extending inwardly from the baffle peripheries thus to channelize any laden liquid movement between adjacent baffles in substantially horizontal direction, whereby said diaphragm closures respond substantially exclusively to change in the specific gravity of the liquid unaffected by laden liquid impact.

References Cited

UNITED STATES PATENTS

| | | | |
|---|---|---|---|
| 668,514 | 2/1901 | Garrels | 73—407 |
| 1,800,532 | 4/1931 | Howard | 73—433 |
| 2,718,145 | 9/1955 | Nisle | 73—301 |

FOREIGN PATENTS 234,941  5/1911  Germany.

JAMES J. GILL, *Primary Examiner.*

RICHARD C. QUEISSER, *Examiner.*

J. D. SCHNEIDER, *Assistant Examiner.*